FIGURE 3

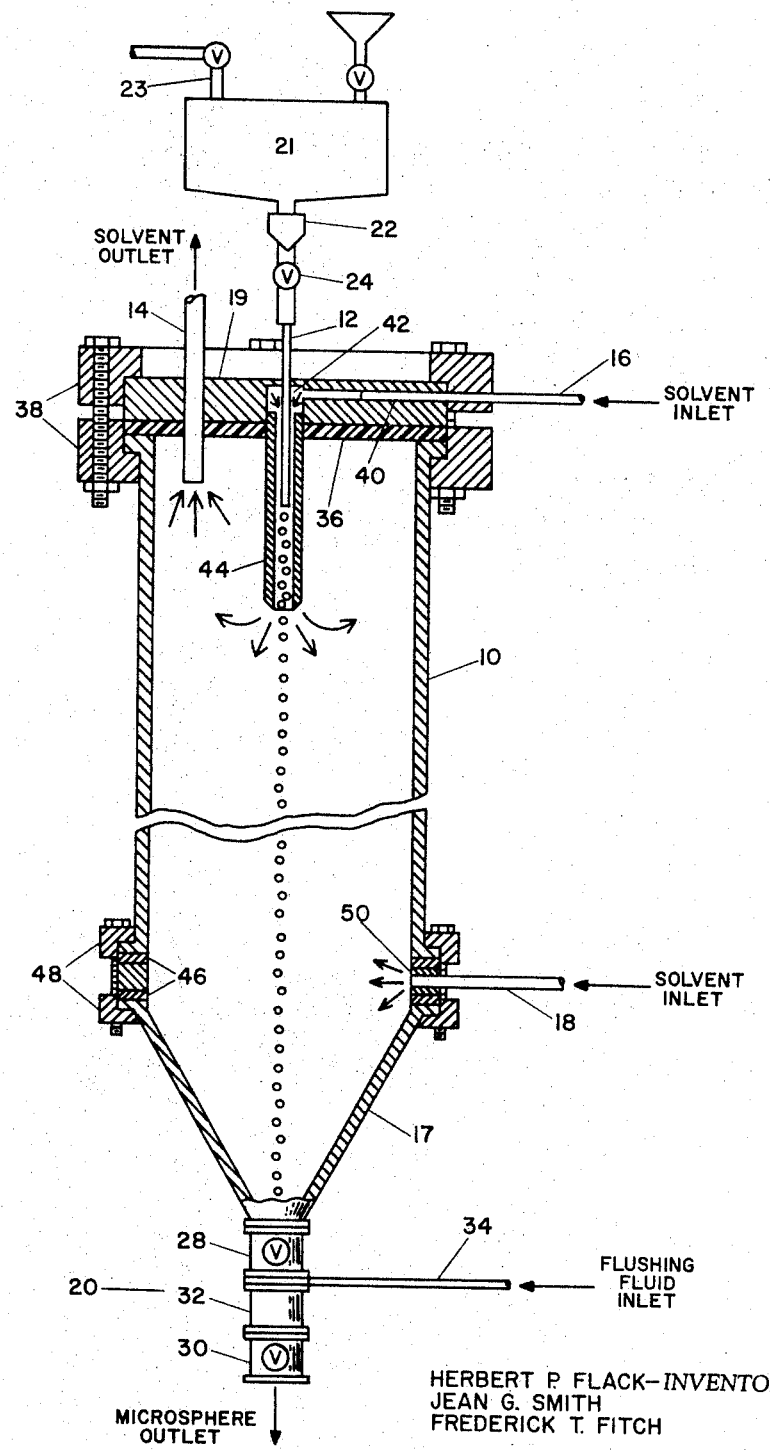

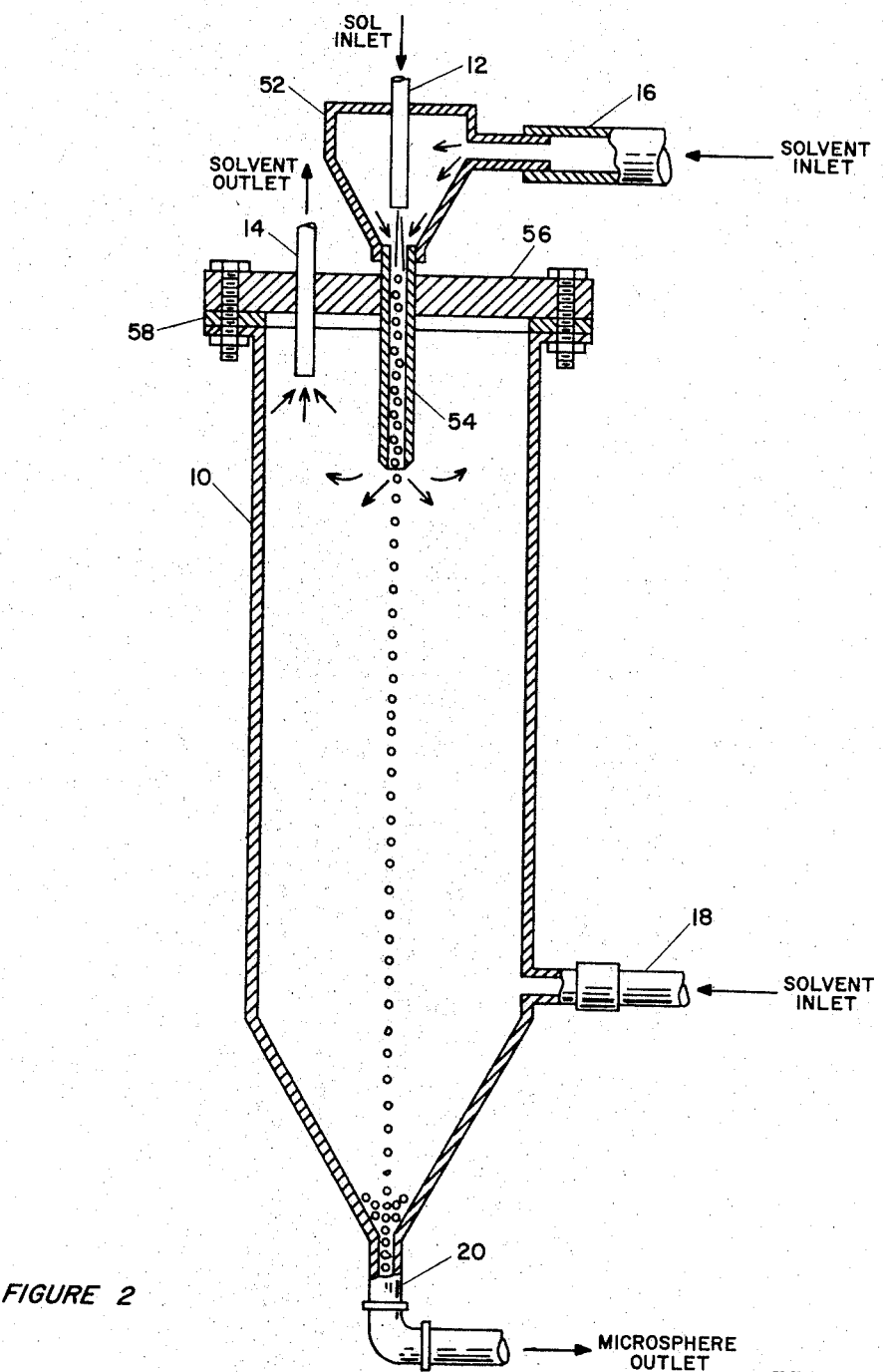

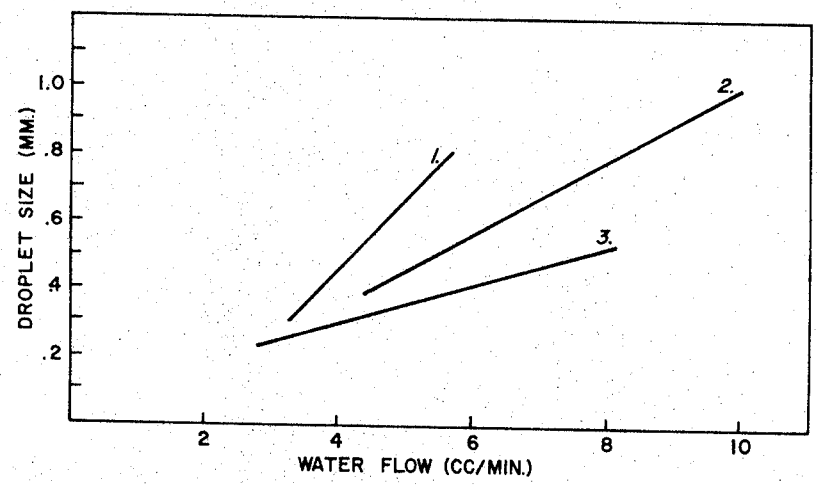

EFFECT OF WATER FLOW ON DROPLET SIZE AT CONSTANT HEXANOL FLOW

1. CAPILLARY I.D. 2 1/4 MM. = HEXANOL FLOW 179 CC/MIN.
2. " " 2 1/4 MM. = " " 238 CC/MIN.
3. " " 1 3/4 MM. = " " 209 CC/MIN.

FIGURE 4

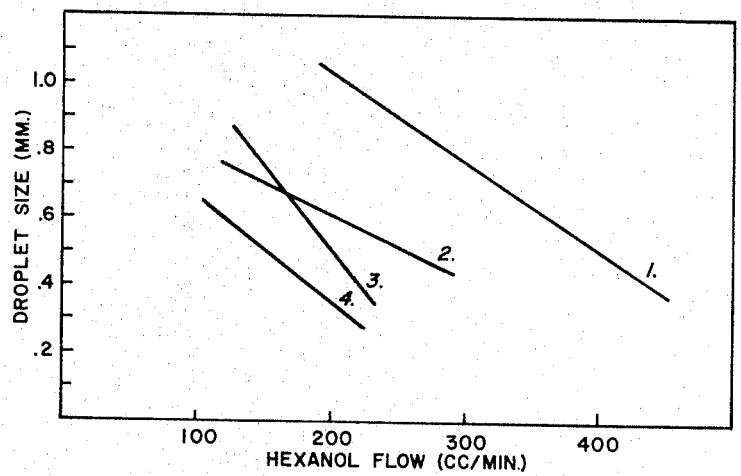

EFFECT OF HEXANOL FLOW ON DROPLET SIZE AT CONSTANT WATER FLOW

1. CAPILLARY I.D. 2 1/4 MM. = WATER FLOW 9.8 CC/MIN.
2. " " 2 1/4 MM. = " " 4.9 CC/MIN.
3. " " 1 3/4 MM. = " " 7.2 CC/MIN.
4. " " 1 3/4 MM. = " " 4.9 CC/MIN.

HERBERT P. FLACK — INVENTORS
JEAN G. SMITH
FREDERICK T. FITCH

BY Joseph P. Nixon
ATTORNEY

United States Patent Office 3,340,567
Patented Sept. 12, 1967

3,340,567
APPARATUS FOR PRODUCING SOL MICROSPHERES
Herbert P. Flack, Ellicott City, and Jean Gillen Smith and Frederick T. Fitch, Baltimore, Md., assignors to W. R. Grace & Co., New York, N.Y., a corporation of Connecticut
Filed May 5, 1964, Ser. No. 364,931
5 Claims. (Cl. 18—2.7)

This invention relates to an apparatus for preparing spherical particles of controlled size formed of collodial residues of aquasols. This apparatus is particularly suitable for preparing dense spheres of nuclear materials such as urania, thoria, plutonia, and other actinide oxides, zirconium oxide, yttrium oxide, and systems containing actinide oxides in combniation with other oxides and with carbon.

In summary the apparatus of this invention is a device for making metal oxide sols into sperical forms comprising in combination, an extraction column having at one end of the column an extraction solvent inlet and a spherical particle outlet and having, at the other end of the column, an extraction solvent outlet and a sol injector comprising means for introducing sol into a stream of solvent to form droplets having a uniform size, and for thereafter introducing the sol droplet-solvent suspension formed into the column.

In summary, the process of this invention is a method for continuously forming sol droplets in a solvent stream which are highly uniform in size, comprising passing a stream of laminar flowing solvent through a confining tube having a diameter within the range of from 1 to 5 mm., and injecting a smaller jet of an aquasol into the center of the solvent stream in a concurrent direction therewith. In the process for producing dense spheres from the sol particles, the solvent stream containing the sol droplets is directed countercurrently into a larger stream of the dehydrating solvent whereby, on passage therethrough, the sperical droplets are dehydrated to form the dense spheres.

Actinide metal oxides have become of paramount importance in the field of nuclear fuels. Current reactor designs, especially the design of the high temperature gas-cooled reactors, have placed very demanding requirements on the fuel employed. The fuel must be resistant to oxidation and fission product release. The fuel must be near theoretical density to provide the requisite efficiency. The fuel elements are usually formed by dispersing the fuel material in a ceramic matrix which is then pressed or compacted into the desired shape under high pressures, and the fuel material must be sufficiently strong to withstand the severe stresses present during compaction. Furthermore, the particles must be of uniform shape and size to effect a homogeneous concentration of fuel in the matrix.

Use of the fuel materials, actinide oxides and carbides, in the form of spherical particles met these stringent requirements. The spherical shape provided the requisite strength. Resistance to oxidation and fission product release was obtained by coating the spherical particles with a refractory metal, metal oxide, or pyrolytic graphite. However, great difficulty was encountered in obtaining uniform particle size, particularly since microspheres found suitable for this application were in the 50 to 200 micron diameter range.

The original technique developed to produce microspheres having a uniform size and shape was laborious, expensive, and had a very low yield. The product obtained lacked sphericity, uniform structure, regular surface, and the requisite strength. Ceramic powders were ground, compacted, crushed to the desired size, shaped into spheroids by abrasion techniques, and sintered to form the particles. At several stages in the process, the powder and particles were sized and the outsized particles were recycled. Generally, yields of less than 20 percent were obtained in each step, rendering the process very inefficient and expensive.

Another process for producing microspheres from sol particles was developed. It was found that metal oxide and metal oxide-carbon microspheres could be formed by dispersing an aqueous suspension of the sol in the form of small droplets in a dehydrating liquid. The spherical droplet shape resulting from surface tension effects was retianed during drying of the microspheres. However, serious difficulties were encountered with the system which rendered it impractical.

The sol was originally dispersed into the body of the dehydrating solvent directly from a small tube. The spherical droplets obtained had a relatively wide range of sizes, however, and the yield of particles in any particular range was low. Very carful control of the process, when obtained, improved the yield to some extent, but the yield was still unsatisfactory and the degree of control required was impractical. In order to obtain droplets having a regular size, a highly regular flow of the sol through the injection tube is required. When higher dehydrating solvent temperatures were employed, the sol sometimes gelled and plugged the tube, and controlled droplet formation was impaired. Still another problem encountered involved imperfect surfaced microspheres. A certain proportion of the spheres were found to be cracked, to contain pits and other surface irregularities, and to be broken into fragments. The irregularities greatly weakened the microspheres, and limited their utility in fuel preparation.

It is one object of this invention, to provide an apparatus which can produce microspheres having a uniform size and surface in a continuous process.

It is another object of this invention to provide a method for producing spherical sol droplets and microspheres having a uniform size and surface.

FIGURE 1 and FIGURE 2 are cross-sectional views of the extraction column and certain embodiments of the sol injection means.

FIGURE 3 shows the effect of water flow on droplet size.

FIGURE 4 shows the effect of dehydrating solvent flow on droplet size.

Referring to FIGURE 1, the extraction column 10 is equipped with a sol injection means, an extraction solvent outlet 14, and a purified solvent inlet 16 at the upper end of the column, and an extraction solvent inlet 18 and a spherical particle outlet 20 at the lower end of the column. The sol injection tube 12 is connected to a sol source providing a uniform, controlled rate of sol flow to the injection tube and communicates with casing tube 44. The sol source can comprise a sol suspension reservoir 21 and an air pressure supply means 23 connected thereto, for example. The rotometer 22 and flow control valve 24 enable a precise control of the sol flow.

The extraction column has a conical bottom 17 and a cap 19. The spherical particle outlet 20 connected to the bottom of the column comprises a first valve 28 connected to and in communication with the bottom of the column 10, a second valve 30 having an inlet and an outlet, and an intermediate chamber 32 communicating with the outlet of the first valve and the inlet of the second valve. Flushing fluid inlet conduit 34 is connected to the extraction solvent inlet conduit 18 and delivers purified solvent to the chamber 32 for flushing the spherical particles therefrom through the second valve 30.

The column cap 19 can be maintained in a sealing relationship at the top of the column by means of gasket 36 and clamp 38. The column cap 19 can be provided with an extraction solvent inlet passageway 40 connected to a chamber recess 42. The injection tube 12 can be mounted on the cap 19, passing therethrough, and passing through the chamber recess 42. The casing tube 44 is attached to and in communication with the chamber recess 42 and is designed to extend into the top of the column 10. The injection tube 12 can extend through a portion of the casing tube. Line 14 is provided for removing extraction solvent from the top of the column and can pass through the column cap 19.

In the alternative design for the apparatus shown in FIGURE 2, the solvent chamber 52 is defined by chamber walls exterior of the column cap. The solvent inlet conduit 16 communicates with the solvent chamber 52 and the sol injection tube 12 is mounted in the top wall thereof. The casing tube 54 can support the solvent chamber 52 and can be, in turn, supported by the column cap 56. The column cap 56 is sealed to the top of column 10 by gasket 58.

An alternative injection tube arrangement is also shown in FIGURE 2. The injection tube 12 is aligned with the casing tube 54 but does not project into the casing tube.

The solvent inlet line 18 can be connected to permanent inlet coupling. Dehydrated microspheres can be removed by an automatic discharge valve or a suction line connected to outlet 20.

The conical bottom 17 of the column 10 as shown in FIGURE 1 is attached to the cylindrical sidewalls by means of conventional gaskets 46, flanges and annular bolted rings 48. The solvent inlet line 18 can pass through an annular ring element 50 between sealing gasket elements 46.

In both the injection tube arrangements shown in FIGURE 1 and FIGURE 2, the injection tube 12 should be axially aligned with the casing tube and, preferably, should be as centrally located as possible for optimum droplet formation. Other arrangements which produce minimal contact between the droplets and the casing tube surface can be used. A less precise location can be employed if uniformity of droplet size is not considered critical.

The casing tube can either surround the end of the injection tube or be spaced therefrom. The critical feature of the arrangement is the location of the point where the sol jet breaks into droplets; this point must be in the casing tube where the controlled laminar flow conditions exist.

The relative dimensions of the casing tube and injection tube are critical features with respect to sol droplets and microsphere formation. They are less critical if sphere formation of larger suspensions are contemplated. The injection tube inner diameter can be within the range of from 0.15 to 0.60 mm., and is preferably within the range of 0.15 to 0.35 mm. for the sols employed. If the injection tube projects into the casing tube, it should not extend beyond about 2 inches and preferably not beyond 3 inches from the outlet end thereof. If the injection tube does not extend into the casing tube, the minimum casing tube length is 2 inches, and preferably 3 inches to insure droplet formation in the tube. The casing tube inner diameter can be within the range of from 1 to 5 mm., preferably from 1.75 to 2.50 mm., and within the optimum range of from 2.00 to 2.25 mm. The inside diameter of the casing tube should be at least 1 mm. greater than the outer diameter of the injection tube. This dimension may be varied depending upon the particular spatial relationship between the two tubes and the contour of the tube walls. The formation of droplets having a highly uniform size from sols requires the dimensions described above. If the system were employed to produce droplets having a less uniform size distribution, a construction of the device outside of the size ranges given would be satisfactory. Similarly, if droplet formation from suspensions containing particles larger than sol particles were contemplated, different dimensions would be necessary. A plurality of injection tube and casing tube combinations can be employed with a single column.

The system of this invention operates as follows:

The sol is forced from the reservoir 21 at a uniform rate of flow by air pressure through line 23. The sol enters the injection tube 12 and exits therefrom as a jet stream into the concurrent laminar flowing stream of dehydrating solvent passing through the casing tube 44 (FIGURE 1) or 54 (FIGURE 2). The sol stream breaks into spherical droplets which are then carried into the top of the column 10 and into the countercurrent flowing stream of dehydrating solvent. The droplets are carried by gravity down the column, and the water phase of the droplet passes into the solvent, leaving a compacted microsphere having a highly uniform size.

The main body of dehydrating solvent is introduced into the column through inlet 18 and exits through conduit 14. The microspheres are removed from the bottom of the column by means of the double valve (FIGURE 1), an automatic discharge valve or a suction device from line 20 of FIGURE 2.

The method of this invention is an improvement of the process for preparing dense spherical oxide particles by dispersing an oxide aquasol to form droplets of uniform size and concentrations, drying said droplets at a controlled rate and temperature while maintaining their spherical form, and recovering the dried colloidal oxide spheres. In the original method, the dehydration was obtained by dispersing the sol in droplets having a uniform size in a dehydrating solvent medium which was maintained at a near constant temperature predetermined to provide the overall process conditions desired.

The improvement of this invention is the discovery in that if the oxide aquasol is originally dispersed in dehydrating solvent which is lower in temperature than the temperature of the remainder of the dehydrating solvent through which the aquasol droplets thereafter pass for final dehydration, the spheroids produced are more uniform in size and shape and have more regular surface characteristics than are otherwise obtainable. In addition, when the aquasol is dispersed from a small tube into a stream of cooled dehydrating solvent flowing around the tube and in the direction of the sol injection, the injection of the sol to form regular spherical droplets having uniform size is greatly facilitated.

The portion of split, pitted, and irregularly size spheroids which were produced by the unimproved method are greatly decreased by this improved process.

In the process of this invention the dehydrating solvent temperature can be any value which provides adequate, controlled dehydration. In column systems temperatures in the range of from about 0 to 50° C. below the water solvent system boiling point at column pressure are suitable. In a stirred pot, the boiling temperature of the solvent can be employed.

This invention is further illustrated by the following specific but non-limiting examples.

EXAMPLE I

This example shows the highly uniform droplet and microsphere sizes produced by the apparatus of this invention over a range of operating conditions. A $UO_2$ sol and hexanol dehydrating solvent was employed. The device was essentially that shown in FIGURE 1 wherein the casing tube inner diameter was 3 mm. and the injection tube was a 23 gage hypodermic needle. The size uniformity is demonstrated by the relatively narrow size range within which most of the droplets fall as shown in Table I. The water content of the dehydrating solvent stream is reflected by the boiling point thereof.

Table I

| Sample No | 1 | 2 | 3 | 4 |
|---|---|---|---|---|
| Sol flow, cc./min | 2.8 | 3.2 | 5.0 | 5.0 |
| Hexanol flow to casing tube, cc./min | 120 | 120 | 120 | 185 |
| Column conditions: | | | | |
| Hexanol flow to column, cc./min | 530 | 580 | 820 | 690 |
| Hexanol temp. to column, °C | 100 | 100 | 106 | 102 |
| Hexanol temp. to casing tube, °C | 29 | 30 | 30 | 32 |
| Boiling point of hexanol stream, °C | 109 | 109 | 115 | 111 |

| Size microns: | Numbers of observed Microspheres | | | |
|---|---|---|---|---|
| 69.0 | 2 | | | |
| 80.5 | 0 | | | |
| 92.0 | 0 | | | |
| 103.5 | 0 | | | |
| 115.0 | 0 | | | 1 |
| 126.5 | 1 | 1 | | 0 |
| 138.0 | 6 | 2 | | 4 |
| 149.5 | 49 | 9 | | 4 |
| 161.0 | 37 | 32 | | 33 |
| 172.5 | 6 | 49 | 2 | 41 |
| 184.0 | 1 | 7 | 8 | 12 |
| 195.5 | | | 23 | 6 |
| 207.0 | | | 34 | |
| 218.5 | | | 19 | |
| 230.0 | | | 11 | |
| 241.5 | | | 2 | |
| 253.0 | | | 1 | |
| Total Numbers | 102 | 100 | 100 | 101 |

As the size distribution shows, not only are the microspheres uniformly sized, but the uniformity in size can be obtained with varying sizes. By merely regulating the sol flow and dehydrating solvent stream flow to the column, the desired microsphere size can be obtained.

EXAMPLE II

This example typically demonstrates the non-uniformity of microsphere sizes produced without the device of this invention. In this example, the sol was uniformly injected into the top of the column and into the countercurrently flowing dehydrating solvent stream. The injection tube was a 23 gage hypodermic needle. The only significant difference in construction was the omission of the casing tube and corresponding concurrently flowing stream of dehydrating solvent. A $UO_2$ sol and hexanol dehydrating solvent were employed. The flow conditions and results are shown in Table II.

Table II

Sol flow, cc./min. ____ 3
Column conditions:
  Hexanol flow to column cc./min. ____ 1150
  Hexanol temp. to column, °C. ____ 104
  Boiling point of hexanol, °C. ____ 144

MICROSPHERE SIZE DISTRIBUTION

| Size, microns | Numbers of Observed microspheres | Size, microns | Numbers of observed microspheres |
|---|---|---|---|
| 218.5 | 1 | 391.0 | 5 |
| 230.0 | 0 | 402.5 | 3 |
| 241.5 | 0 | 414.0 | 4 |
| 253.0 | 0 | 425.5 | 5 |
| 264.5 | 4 | 437.0 | 1 |
| 276.0 | 1 | 448.5 | 3 |
| 287.5 | 5 | 460.0 | 5 |
| 299.0 | 1 | 471.5 | 3 |
| 310.5 | 5 | 483.0 | 3 |
| 322.0 | 8 | 494.5 | 1 |
| 333.5 | 5 | 506.0 | 4 |
| 345.0 | 9 | 517.5 | 0 |
| 356.5 | 7 | 528.0 | 1 |
| 368.0 | 5 | 539.5 | 3 |
| 379.5 | 8 | | |

Total number of observed microspheres=100.

The microspheres produced by the direct injection technique had a very wide particle size distribution in marked contrast to the microspheres produced by this invention. Furthermore, the size range was not significantly adjustable.

EXAMPLE III

The following example demonstrates the capability of the described sol injection device to produce droplets of a narrow size distribution and to regulate their size by the design and control of operating conditions.

A length of capillary tubing was mounted vertically extending about 3 inches into a cylinder filled with hexanol and was connected at the top through a stop cock and flowmeter to a hexanol reservoir capable of supplying a regulated hexanol flow. A 2 inch 23 gage hypodermic needle was passed through a seal at the top of the capillary tubing and extended 1 cm. into the tube. The needle was accurately aligned concentrically in the capillary tubing to project a stream of fluid without contacting the capillary walls. The hypodermic needle was connected through a stop cock and flowmeter to a water reservoir also capable of supplying a regulated water flow. Water and hexanol flows were adjusted to project a thin concentric water stream into the concurrent flowing hexanol stream which, after several inches, formed a stream of uniform droplets passing through the capillary and into the cylinder of hexanol. The resulting drops and their formation were observed closely and measured through a magnifying system and scale. The phenomena was observed to be very uniform, reflecting physical dimensions and the applied liquid flows, and the resulting drops had a very narrow size distribution. The effect of hexanol flow, water flow, and capillary inner diameter on the resulting droplet size is indicated in FIGURE 3 and FIGURE 4 for typical operating conditions. Droplet size was increased by decreasing hexanol flow or increasing water flow, and these conditions were used to regulate the size over a range of from about 0.2 to 1.0 mm. in diameter. The above behavior was duplicated with $UO_2$ sols of 5 to 15 weight percent solids concentration. For comparison, drops formed by injecting the water directly into the hexanol from hypodermic needles were observed. There was little uniformity in droplet size, and proper droplet formation could be obtained only over a narrow range of water flows. The size could not be regulated to any significant extent.

This example demonstrates the operation performance of the sol injection device in producing uniform droplets and in regulating their size.

The apparatus and process of this invention is a highly important advance in microsphere preparation, producing microspheres and sol droplets on a continuous scale having a highly uniform size and shape.

We claim:

1. An apparatus for making sols into spherical forms comprising in combination:
   (a) an extraction column having a first and a second end,
   (b) an extraction solvent inlet at the first end of the column,
   (c) a spherical particle outlet at the first end of the column,
   (d) an extraction solvent outlet at the second end of the column, and
   (e) a sol introduction means at the second end of the column comprising a means for introducing the sol into a stream of solvent to form a droplet-solvent dispersion and for introducing the droplet-solvent dispersion into the second end of the column, the sol introduction means comprising a casing tube and an injection tube extending into the casing tube, the injection tube having an inside diameter of from 0.15 to 0.60 mm., having an outer diameter at least one mm. smaller than the inner diameter of the casing tube, and being axially aligned with and terminating at least about 2 inches from the end of the casing tube.

2. The apparatus of claim 1 wherein the injection tube extends centrally through the inlet end of the casing tube.

3. A device for forming uniformly sized sol droplets comprising:
(a) a casing tube having an inner diameter within the range of about from 1 to 5 mm.,
(b) chamber means in communication with one end of said casing tube for delivering solvent thereto,
(c) an injection tube attached to said chamber means and having an inner diameter of from 0.15 to 0.60 mm., having an outer diameter at least 1 mm. smaller than the inner diameter of the casing tube, and being axially aligned with and terminating at least 2 in. from the outlet end of the casing tube.

4. The device of claim 3 wherein the injection tube extends centrally through the inlet end of the casing tube.

5. A device for forming uniformly sized sol droplets comprising:
(a) a solvent chamber defined by an enclosing wall having inlet and outlet passageways in said wall,
(b) a sol injection tube sealingly attached to said enclosing wall and having an inlet end communicating with the exterior of said wall for receipt of the sol suspension and having an outlet end extending through said solvent chamber outlet passageway, said sol injection tube having an inside diameter of 0.15 to 0.60 mm., and
(c) a casing tube having an inlet end attached to and communicating with said solvent chamber outlet passageway and having an outlet end, said casing tube surrounding and spaced apart from the sol injection tube outlet end and having an inside diameter at least 1 mm. greater than the outside diameter of the injection tube, whereby the sol suspension is injected from said injection tube into a stream of solvent passing through the said casing tube.

References Cited
UNITED STATES PATENTS

| | | | |
|---|---|---|---|
| 2,475,984 | 7/1949 | Owen | 34—168 X |
| 2,676,892 | 4/1954 | McLaughin | 263—21 X |

FREDERICK L. MATTESON, Jr., *Primary Examiner.*

D. A. TAMBURRO, *Assistant Examiner.*

UNITED STATES PATENT OFFICE
CERTIFICATE OF CORRECTION

Patent No. 3,340,567 September 12, 1967

Herbert P. Flack et al.

It is hereby certified that error appears in the above numbered patent requiring correction and that the said Letters Patent should read as corrected below.

Column 6, line 68, before "and" insert -- having inlet and outlet ends"; line 69, after "tube" insert -- and having an outlet opening therein --; line 73, after "with" insert -- the casing tube, and said outlet opening thereof being positioned --; same line 73, strike out "and terminating"; line 74, before "end" insert -- outlet --; column 7, line 5, before "having" insert -- having inlet and outlet ends and --; same column 7, line 7, for "one" read -- the inlet --.

Signed and sealed this 22nd day of October 1968.

(SEAL)
Attest:

Edward M. Fletcher, Jr.  EDWARD J. BRENNER
Attesting Officer  Commissioner of Patents